United States Patent [19]
Southam et al.

[11] Patent Number: 5,844,676
[45] Date of Patent: Dec. 1, 1998

[54] METHOD AND APPARATUS FOR MEASURING RADIAL ERROR OF ROTATING ENCODED DISKS

[75] Inventors: Gordon R. Southam, Grass Valley; Patrick H. Dwyer, Penn Valley, both of Calif.

[73] Assignee: Quadrant Engineering, Inc., Penn Valley, Calif.

[21] Appl. No.: 866,405

[22] Filed: May 29, 1997

[51] Int. Cl.⁶ .................................................. G01N 21/00
[52] U.S. Cl. ........................... 356/237; 356/373; 356/375
[58] Field of Search ................................ 356/237, 373, 356/375, 423

[56] References Cited

U.S. PATENT DOCUMENTS

4,042,302  8/1977  Wentz ........................................ 356/364
5,237,383  8/1993  Parisi ........................................ 356/73.1

*Primary Examiner*—Georgia Y. Epps
*Assistant Examiner*—Reginald A. Ratliff
*Attorney, Agent, or Firm*—John P. O'Banion

[57] ABSTRACT

An apparatus and method for measuring in real time the eccentric error of a rotating body, particularly an encoded optical disk. An eccentricity measurement pattern comprising a plurality of concentric spaced apart diffraction rings are included on an encoded disk. An error read head with a plurality of laser beams is positioned to reflect laser light off the eccentricity measurement pattern on the disk. The relative radial spacing of the laser beams on the error read head is adjusted to a non-integral multiple of the radial spacing of the diffraction rings. Output signals from the error read head are generated according to reflected laser light from the eccentricity measurement pattern which is detected by the error read head. The output signals are converted to count and direction information.

19 Claims, 9 Drawing Sheets

METHOD AND APPARATUS FOR MEASURING RADIAL ERROR OF ROTATING ENCODED DISKS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains generally to devices and methods for rotational position measurement and rotary encoding, and more particularly to an apparatus and method for accurately measuring in real time the eccentric error of rotating bodies such as encoded optical disks that are attached to and rotating about a rotational axis. The measured eccentric error allows correction in real time of measurements or data reading errors caused by the eccentricity of the rotating body, including the rotating axis.

2. Description of the Background Art

There exist numerous situations wherein precisely centered or highly accurate rotation of a body or member is required, such as during precision machining of rotating parts, and for the reading of encoded disks. Encoded, optically-read disks, for example, are widely used as computer ROM media and for audio and video recording media for stereophonic and video systems. The disks are read by one or more laser beams from a reading device or read head which detect, by differences in reflectivity, the presence or absence of pits or ablations in a disk as the disk rotates.

A problem which is always present in systems utilizing encoded (optical or otherwise) disks is that the rotating mechanical assemblies to which such disks are typically attached during reading will nearly always have some amount of eccentric or radial error. There is an ideal center or center in the pattern of encoded data on an encoded disk, whether the encoded data is formed on the encoded disk as concentric rings, a continuous spiral, radial spokes, or some other pattern. However, the ideal center may not correspond to the actual rotational center or rotational axis of the disk. For example, when an encoded disk is mounted to a rotating assembly with a read head, free-play, run out wobble in a bearing, and other factors cause the exact location of the point of rotation to change slightly with time. Thus, there will nearly always be some difference between the actual rotational axis of a disk and the ideal center of the disk according to the encoded data thereon.

The static eccentricity of a disk is the distance between the center of the encoded data on the disk and the center of rotation or rotational axis of the disk. The total eccentric error in an encoded disk is the sum of the static errors (e.g., the ideal center of the encoded disk rotates at some distance from the true center of rotation at a fixed radius) and the dynamic errors (e.g., the free-play and run out wobble in a bearing). As a result of this eccentricity, there occurs some amount of error in the reading back of the data encoded on the disk. The precise measurement of the eccentricity or radial error in a rotating, encoded disk allows correction of the readback error. Presently, there are no devices or methods available which adequately provide for accurate detection or measurement of the eccentricity of encoded disks.

Thus, there is a need for an apparatus and method for measuring radial error or eccentricity of rotating bodies which can quickly and accurately determine eccentric error in a rotating body. The present invention satisfies this need, as well as others and generally overcomes the deficiencies found in the background art.

BRIEF SUMMARY OF THE INVENTION

The present invention is an apparatus and method for accurately measuring in real time the eccentric error in a rotating body such as encoded disk.

In order to read encoded data on a disk generally, a data read head is positioned over the encoded disk at some distance from the center of rotation or rotational axis. The point in space where this data read head actually reads the encoded data is called the "reference point". The line between the center of rotation and the reference point is called the "reference line". When eccentricity occurs in an encoded disk in the direction of the reference line or parallel to the reference line, the location of the encoded data is at a different radius or radial location relative to the data read head and reference point than would be expected. When eccentricity occurs in a direction perpendicular to the reference line, the location of the encoded data is both at a different angle and a slightly different radius with respect to the data read head and reference point. When eccentricity occurs in any other direction, the eccentricity can be treated as the vector sum of two orthogonal components: the component of eccentricity occurring in the direction of the reference line, and the component of eccentricity occurring in the direction perpendicular to the reference line. Any of these types of eccentric misalignments of the encoded data with the data read head is likely to result in data read errors.

The apparatus of the invention, which measures in real time the eccentricity in a rotating body such as an encoded disk, comprises, in general terms, in addition to the data read head, one or more optical read heads or readers used as error detectors (hereafter "error read head(s)"), with each such error read head having a plurality of lasers, and an optically readable eccentricity measurement pattern having a plurality of diffraction rings. Means for converting the output from the error read head or read heads into count and direction signals for a bidirectional counter are preferably included with the invention. The eccentricity measurement pattern is preferably written onto a conventional encoded disk by standard laser writing means.

With the use of a first suitably positioned error read device or error read head, the present invention can measure either of the two aforementioned orthogonal components of eccentricity, i.e., the component of eccentricity occurring in the direction of the reference line, or the component of eccentricity occurring in the direction perpendicular to the reference line, with the reference line and reference point defined by the location of the data read head. The use of a second error read head with the invention, together with the first error read head, allows both orthogonal components of eccentricity to be measured and the vector sum calculated.

By way of example, and not of limitation, the invention employs a first error read head which includes three co-linearly arranged lasers together with detection or receiver optics for detection of reflected light from the laser beams emitted by the lasers. To measure the eccentricity of the encoded disk in the direction perpendicular to the reference line, the first error read head is placed at a position which is generally ninety degrees around the center of rotation of the disk from the reference point. The location of the first error read head is called the error point or e-point, with the central laser beam of the first error read head being directly above the e-point. Thus, the e-point will be on a line (hereafter referred to as the error line or e-line) tangent to and intersecting the reference line at the center of rotation. The distance between the center of rotation and the e-point is preferably of similar magnitude to the distance between the center of rotation and the reference point. Thus, the reference point and e-point preferably are equidistant from the rotational axis of the disk, and the reference line and e-line, which extend radially outward from the rotational axis, are generally ninety degrees apart radially, or at a right angle to each other.

The first error read head is preferably oriented at about a ninety degree angle of rotation from the conventional orientation of a read head for a standard encoded disk. The three laser beams from the lasers of the first error read head thus are aligned more or less along a radial line extending from the center of the encoded disk rather than along a line tangential to the circumference of the disk. The data read head, which is located at the reference point, is typically oriented in a conventional manner, with the three laser beams from the lasers therein being oriented along a line which is tangential to the circumference of the encoded disk.

If a second error read head is used, it is preferably positioned at a location along the reference line. It may be positioned either at or near the reference point or at a position one hundred eighty degrees around the center of rotation of the disk from the reference point. The distance between the center of rotation and the second error read head is preferably of similar magnitude to the distance between the center of rotation and the first error read head.

Since the second error read head, if used, is generally ninety degrees around the center of rotation from the error line, it can be thought of as measuring the eccentricity perpendicular to the error line. While the following discussion will focus on the first error head measuring the eccentricity perpendicular to the reference line, the second error read head, if used, would analogously measure the eccentricity perpendicular to the error line. That is, it would use the same type of pattern, the same orientation relative to the center of rotation, and the same procedures, and thus, the same mathematics would apply. The only distinction between the operation of the two error read heads is that they measure different, orthogonal components of the total eccentricity.

By measuring both orthogonal components of eccentricity e1 and e2, the total eccentricity can be readily computed as the vector sum. The total magnitude M is:

$$M^2 = E_1^2 + E_2^2$$

and, relative to the reference line, the direction is φ=inverse sin (e1/e2).

The eccentricity measurement pattern of the invention is preferably included on a standard optical disk such a molded polycarbonate CD of the type commonly used for audio, video or data CDs. The optical disk with the eccentricity measurement pattern will also generally have encoded data thereon which is read in a standard manner by the reference read head or another read head. The eccentricity measurement pattern comprises a plurality of concentric, radially spaced apart diffraction rings. The diffraction rings are written on the disk in the form of pits which are registered as impressions in the reflective surface and which are preferably as deep as ¼th the wavelength of the laser light used by the reference head and error read head to read the disk. Each diffraction ring in the eccentricity measurement pattern is formed by a series of "pits" and "lands" small enough to form a diffraction grating at the frequency of the lasers of the reference head and error read head being used for reading the pattern on the disk. The pits of the diffraction rings are spaced apart within each ring at a distance generally equal to the pit width. The pit width and distance between the pits is a carefully chosen dimension which is less than the width or distance between adjacent pits as used in normal data encoding applications. Each diffraction ring is separated by a ring of continuous land (unpitted area) or a "clear ring" wide enough to be distinguished by the reading lasers of the error read head and reference read head.

When one of the three laser beams from the three lasers in the error read head is focused on a clear ring or space between the diffraction rings, nearly all of the light from that laser beam is reflected back to the detection or receiver optics in the error read head. If the beam is focused on a diffraction ring, however, most of the light is diffracted away from the receiver optics of the error read head. Thus, in effect, the eccentricity measurement pattern can be perceived by the error read head as alternating light and dark rings generated by alternating reflective and diffractive surfaces.

The light reflected from the eccentricity measurement pattern on the disk is used to determine the radial position of the encoded disk under the error read head. By electrically distinguishing the presence or absence of reflected light, the light receiver on the error read head generates a signal that represents the relative positions of the error read head beams over the diffraction rings of the eccentricity measurement pattern. As the rings move radially under the laser beams of the error read head due to eccentricity in the rotational motion of the disk, the amount of light reflected changes and waveforms results at the error read head receiver which represent the patterns of diffraction rings moving under the beams of the error read head. By using all three laser beams in the error read head, and orienting them so that their relative radial spacing is a non-integral multiple of the radial spacing of the diffraction rings, the three laser beams of the error read head form a multiphase signal from which counting and direction information can be obtained. If, for example, the error read head laser beams are positioned such that their relative radial spacing is n±⅓ the diffraction ring spacing of the eccentricity measurement pattern, the three error read head laser beams form a multiphase signal with sixty electrical degrees between each beam, resulting in a 6× multiplication in resolution, and determination of direction. Thus, for each period n between rings, six counts can be obtained with a n±⅓ relative radial spacing.

The error read head pivotally moves about an axis passing through the central laser beam and e-point. By adjusting the exact angle between the e-line and line passing through the three laser beams of the error read head, it is possible to adjust the relative radial spacing of the three laser beams of the error read head with respect to the radial spacing of the diffraction rings in the eccentricity measurement pattern beneath them. The angle between the e-line and the line defined by the three laser spots from the lasers of the error read head is called the adjustment angle. Thus, the number of diffraction rings (and fractions thereof) spanned by the three adjacent laser beams of the error read head can be changed by rotating the error read head about the center beam, which is aligned at the e-point, thereby changing the adjustment angle. The result is an adjustable, relative radial spacing between the laser beams of the error read head and the diffraction rings of the eccentricity measurement pattern. In cases where the relative radial spacing between the laser beams is not an integral multiple of the spacing between the diffraction rings of the eccentricity measurement pattern, the three laser beams of the error read head are fully differentiated; i.e., each of the three laser beams will reflect off a different portion of a diffraction ring than the other laser beams, resulting in fully differentiated outputs for each of the laser beams. The fully differentiated outputs are communicated to converting means and converted to count and direction information for use in correction of data reading errors which occur at the reference head due to the eccentricity of the disk.

The means for converting the output from the error read head into count and direction signals for a bidirectional counter preferably comprises a computer or digital converter circuit or like programmed data processing means. The converting means preferably utilizes an approximation that the magnitude of reference read error (in normal circumstances) is being equal to the magnitude of the component of eccentricity in the direction perpendicular to the reference line.

The method of using the invention comprises, in general terms, the steps of providing an eccentricity measurement pattern on an encoded disk, providing a suitably positioned error read head with three lasers for reading the eccentricity measurement pattern, positioning or orienting the error read head so that the relative radial spacing of the three laser spots from the lasers of the error read head is a non-integral multiple of the radial spacing between the diffraction rings of the eccentricity measurement pattern such that the outputs from the reflected laser beams are fully differentiated, communicating the outputs to converting means, and converting the outputs to count and direction information for use in correction of data reading errors.

An object of the invention is to provide an apparatus and method for measuring eccentric error in a rotating member which allows quick and accurate real time eccentricity measurement.

Another object of the invention is to provide an apparatus and method for measuring eccentric error in a rotating member which allows real time correction of reading errors with encoded disks.

Another object of the invention is to provide an apparatus and method for measuring eccentric error in a rotating member which provides output for conversion to count and direction signals for high speed bidirectional counters.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 11. It will be appreciated that the apparatus may vary as to configuration and as to details of the parts, and that the method may vary as to details and the order of the steps, without departing from the basic concepts as disclosed herein.

Figure 1:
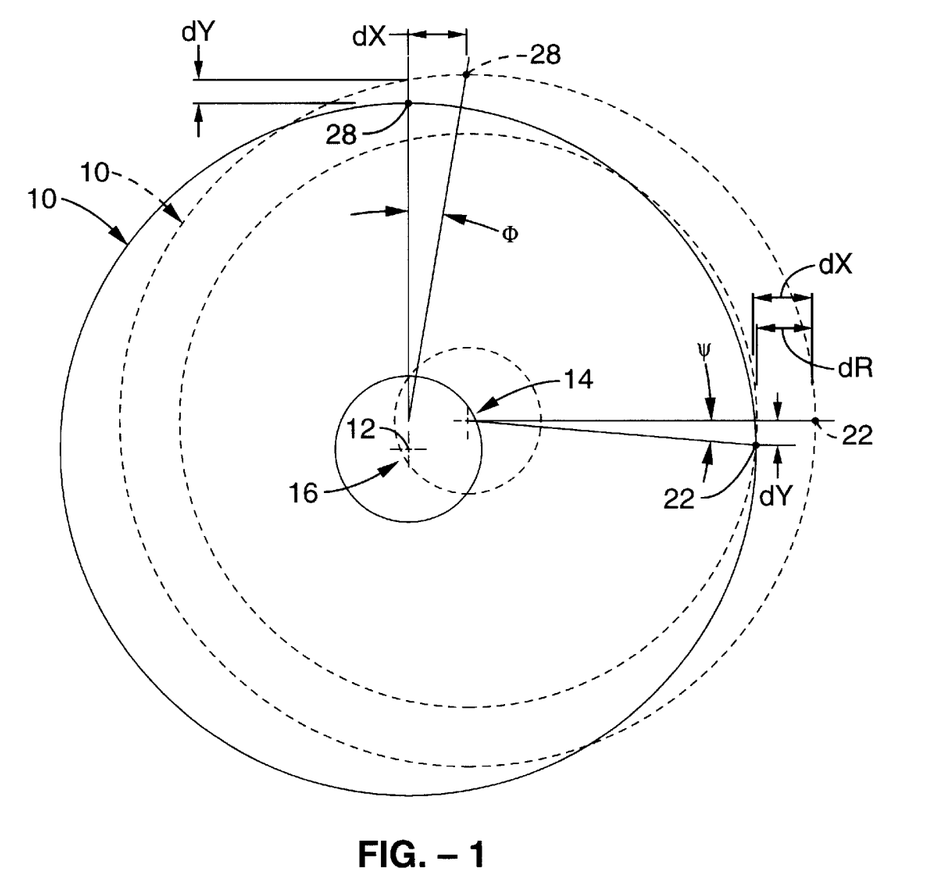
FIG. 1 is a diagram in top plan view illustrating component eccentricity in a rotating encoded disk.

Referring first to FIG. 1, a rotary encoded disk 10 is generally shown. The purpose of this invention is to accurately measure, in real time, the eccentric error or rotational eccentricity of encoded disk 10 or other rotating body that is rotating about a rotational axis 12, with the purpose of correcting, in real time, any measurement or reading error of the encoded data (not shown) on disk 10 caused by the eccentricity of the disk 10. The invention is useful because the mechanical assembly (not shown) to which disk 10 is typically attached will always have some amount of eccentric error. That is, there will always be some difference between where the ideal center 14 of encoded disk 10 actually is located on a particular assembly and the actual center of rotation 16 where the ideal center 14 of encoded disk 10 should be located. This difference results in some amount of error in the readback of the encoded data on disk 10. By measuring the eccentric error in real time, this invention allows the error to be corrected or adjusted. The static eccentricity of disk 10 and the mechanical assembly on which disk 10 is mounted is generally the distance between the center ideal 14 of the encoded disk and the center of rotation 16. The total eccentric error in disk 10 is generally the sum of the static errors (e.g., the ideal center 14 of the encoded disk rotates at some distance from the true center of rotation 16 at a fixed radius), and the dynamic errors (e.g., the free-play and run out wobble in a bearing or other part of the mechanical assembly on which the disk 10 is mounted). Note that the relative distance between ideal center 14 and center of rotation 16 of disk 10 as shown in FIG. 1 is exaggerated for clarity.

In any system with an encoded disk 10, there is an ideal or true center 14 at the center of the encoded data on disk 10. However, the ideal center 14 may not correspond to the physical or rotational center 16 of the encoded disk 10. Whether the encoded data is formed on disk 10 as concentric rings, a continuous spiral, radial spokes, or some other data pattern, there is a center 14 of the pattern of encoded data corresponding to the ideal center 14 of encoded disk 10. When encoded disk 10 is mounted to a rotating assembly, there will exist a point or center of rotation 16 around which encoded disk 10 actually does rotate. As related above, free-play, run out, and other factors may cause the exact location of the center of rotation 16 to change slightly with time.

Figure 2:
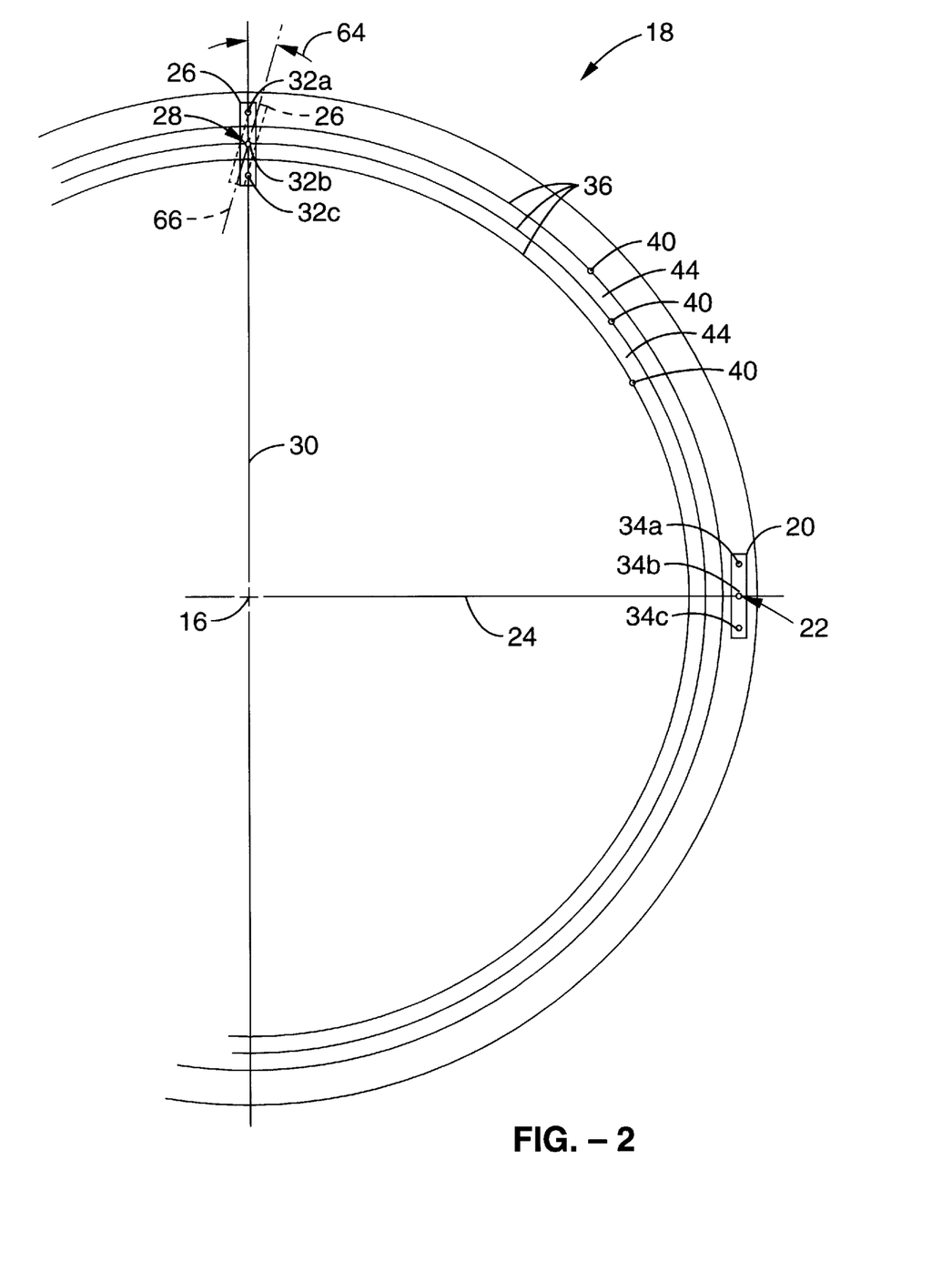
FIG. 2 is diagram in top plan view illustrating a rotational eccentricity measurement apparatus in accordance with the present invention in relation to a portion of an eccentricity measurement pattern on an encoded disk.

Referring now to FIG. 2, as well as FIG. 1, an apparatus 18 for measuring eccentric error or rotational eccentricity is generally shown. In order to read back encoded data from disk 10, the apparatus 18 includes a read device or read head 20 positioned over the encoded disk 10 at some distance from the center of rotation 16. Read head 20 is a three-beam laser read head. The point in space where read head 20 actually reads the encoded data is called, for the purposes of the present invention, the "reference point" 22. The line 24 extending radially between the center of rotation 16 and the reference point 22 is referred to as the "reference line" 24, and read head 20 is called the reference read head 20.

When eccentricity occurs in disk 10 in the direction of reference line 24 or parallel to reference line 24, the location of the encoded data is at a different radius or radial location than expected by the reference read head 20. When eccentricity occurs in a direction which is perpendicular to reference line 24, the location of the encoded data on disk 10 is both at a different angle and a different radius than expected by reference read head 20. When eccentricity occurs in any other direction, it can be treated as the vector sum of two orthogonal components: the component of eccentricity occurring in the direction of reference line 24 and the component of eccentricity occurring in the direction perpendicular to reference line 24. Any of these types of eccentric misalignments of the encoded data on disk 10 with reference read head 20 is likely to result in encoded data read errors.

With the addition and proper alignment of a second read device or read head as explained below in detail, this invention can measure either of the two aforementioned orthogonal components of eccentricity. And, If two read heads are used with the invention in addition to reference read head 20, both orthogonal components of eccentricity can be measured and the vector sum calculated.

The present invention is particularly well suited for use in correction of eccentric error in a high resolution rotary encoder by measuring the component of eccentricity in the direction perpendicular to the reference line 24. In such an application, the component of eccentricity in the direction of the reference line 24 does not directly contribute to read error, and therefore need not be measured under normal circumstances. The error in angular measurement of disk 10 or other rotating body introduced by the component of eccentricity in the direction perpendicular to reference line 24 is, in normal circumstances, very nearly equal to the magnitude of the component of eccentricity in the direction parallel to the reference line 24, and can be considered equal. The error caused by the component of eccentricity in the direction of the reference line 24 is, under normal circumstances, very small, and can be neglected, as discussed more fully below.

To measure the eccentricity of disk 10 in the direction perpendicular to reference line 24, a three-beam laser read head 26 is used in conjunction with a special eccentricity measurement pattern added to encoded disk 10. Read head 26 is hereinafter referred to as error read head 26, and is placed at a error reading position or point 28, called the e-point 28, which preferably is ninety degrees around the center of rotation 16 from reference point 22. Thus, the e-point 28 will be on a line 30, hereinafter called the e-line 30, which is tangent to reference line 24 and which intersects reference line 24 at the center of rotation 16. Although there are no inherent constraints on the distance between the center of rotation 16 and e-point 28, the distance between center of rotation 16 and e-point 28 will generally be of similar magnitude to the distance between center of rotation 16 and reference point 24.

The error read head 26 used in the invention is a three-beam laser read head having lasers 32a, 32b, 32c. Reference read head 20 likewise generally includes three lasers 34a, 34b, 34c. In the present invention, the error read head 26 is preferably oriented at about a ninety degree rotation from its conventional orientation as a read only head, so that the three lasers 32a, 32b, 32c thus are aligned more or less along e-line 30 which extends radially through the center of rotation 16 of disk 10, rather than along a line (not shown) which is tangential to the circumference of disk 10. The exact angle of orientation of error read head 26 is adjusted at final assembly of the apparatus 18 to facilitate fine adjustment of the relative radial spacing between the three lasers 32a, 32b, 32c as discussed below.

In the conventional use of a three laser read head assembly, the three laser beams are used for two separate purposes. First, the center beam is used to read the information from a disk which is encoded in the form of a digital code impressed into the disk such that the laser light is alternately scattered away from, and reflected back into, the read head as each impressed mark, and unimpressed space goes by the read head. These impressions on the disk are generally referred to as "pits", and the unmarked space around them is generally referred to as "land", or "lands". Second, the side laser beams, or "satellite spots" as they are known are used to keep the main or center laser beam centered over the line of pits which encode the information. None of the encoded information is read by the satellite laser beams. The intensity of light reflected by the two side laser beams varies if the main or central laser beam drifts from the center of its track; in which case the reflected light from a side beam will increase in intensity if the main laser beam is off-centered towards its direction and will decrease when the main laser beam is off-centered away from its direction.

In this invention, all three lasers 32a, 32b, 32c of error read head 26 are used in the same manner. The central laser 32b and the two outer or satellite laser beams 32a, 32c are amplified and digitized to be used as direct inputs to converter means such as a converter circuit, as described further below. Thus, all three laser beams 32a, 32b, 32c of error read head 26 are used to read information about every pit that passes beneath them.

Figure 3:
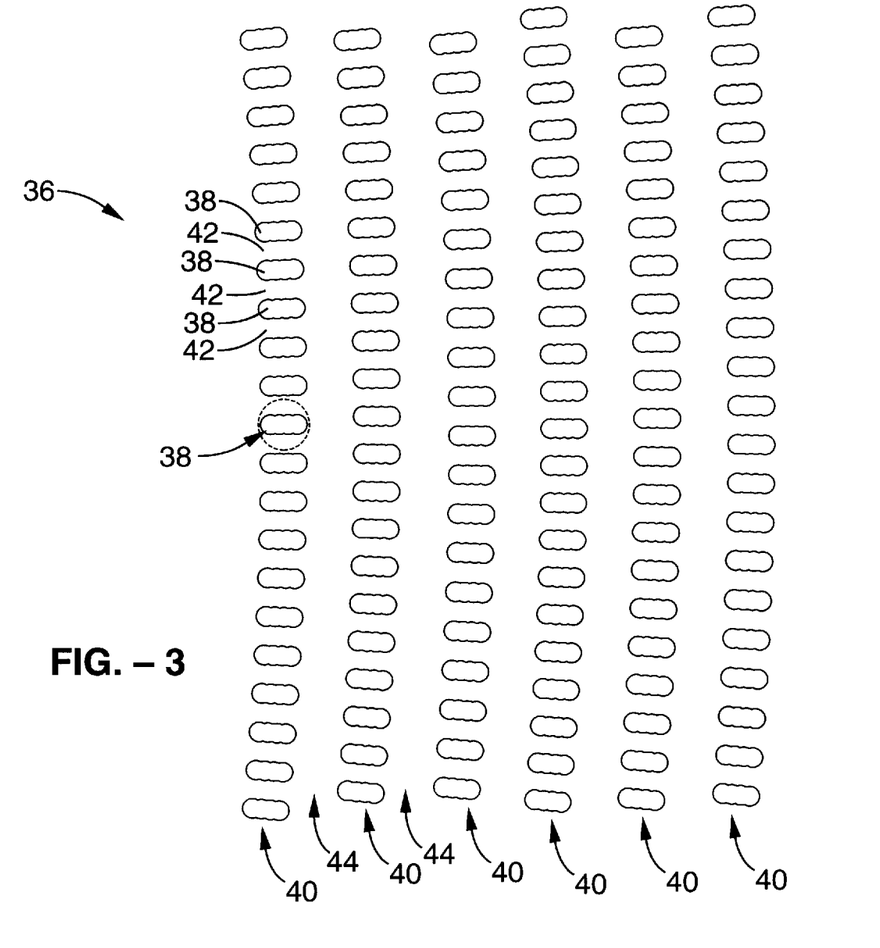
FIG. 3 is a top plan view in detail of a portion of a first embodiment eccentricity measurement pattern in accordance with the invention.
Figure 4:
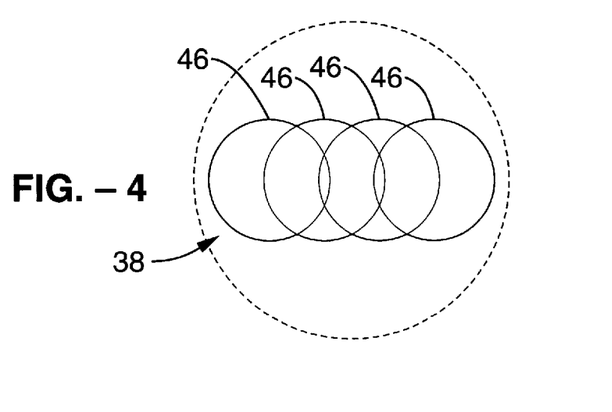
FIG. 4 is a detail view of a pit in the measurement pattern shown in FIG. 3 showing the overlapping pitlets forming the pit.

Referring now to FIG. 3 and FIG. 4, as well as FIG. 2, the invention includes an eccentricity measurement pattern 36 which is located on disk 10. Disk 10 is preferably a standard molded polycarbonate CD of the same type used for Audio or read-only CD-ROMs. Pits 38 are registered as impressions in the reflective surface of disk 10, with pits 38 generally being as deep as ¼th the wavelength of the laser light from error read head 26 and reference read head 20 used to read disk 10.

The eccentricity measurement pattern 36 comprises a series of concentric, radially spaced apart diffraction rings 40 which are centered about ideal center 14 of disk 10. Each diffraction ring 40 is formed by a series of alternating "pits" and "lands" 42 which are small enough in size to form a diffraction grating at the frequency or wavelength of the laser light from lasers 32a, 32b, 32c of error read head 26. Diffraction rings 40 are made of pits 38 and lands 42 which are spaced apart at a distance equal to the width of pits 38. Pits 38 preferably are elongated in the radial direction as shown. The width of pits 38 is a carefully chosen dimension which is less than the width of the pits 38 used in a normal data encoding application. By spacing pits 38 closely together, it becomes impossible for the lasers 32a, 32b, 32c of error read head 26 to distinguish the individual pits 38 of diffraction rings 40. Each concentric diffraction ring 40 is radially separated or spaced apart from adjacent diffraction rings 40 by a ring of continuous, unpitted land called a "clear ring" 44. The clear rings 44 between diffraction rings 40 are wide enough to be distinguished from diffraction rings 40 by lasers 32a, 32b, 32c of error read head 26. FIG. 3 shows a relatively low density eccentricity measurement pattern 36. As can be seen in FIG. 3, pits 38 are oriented perpendicular to the normal direction in which pits are normally recorded by CD mastering equipment.

It is desirable (although not necessary) to create eccentricity measurement pattern 36 by using readily available CD mastering techniques and equipment. To achieve this, the pits 38 of diffraction rings 40 may be formed as overlapping recording passes of small, tightly spaced pitlets 46 as shown in FIG. 4. By overlapping successive rings of radially aligned short pitlets 46, the result is amalgamation of pits 38 which are the desired shape.

When one of the three lasers 32a, 32b, 32c in error read head 26 is focused on a clear ring 44 between diffraction rings 40, nearly all of the light from the laser is reflected back to the receiver optics (not shown) of error read head 26. If the laser 32a, 32b or 32c is focused on a diffraction ring 40, most of the laser light is diffracted away from the receiver optics of error read head 26. Thus, in effect, the eccentricity measurement pattern 36 can be perceived as alternating light and dark rings generated by alternating reflective and diffractive surfaces. Because of the novel construction of the eccentricity measurement pattern of the invention, the width and spacing of these alternating light and dark rings is arbitrary (for any spacing combinations above the resolution limit), and can be adapted to the circumstances of a particular application.

Figure 5:
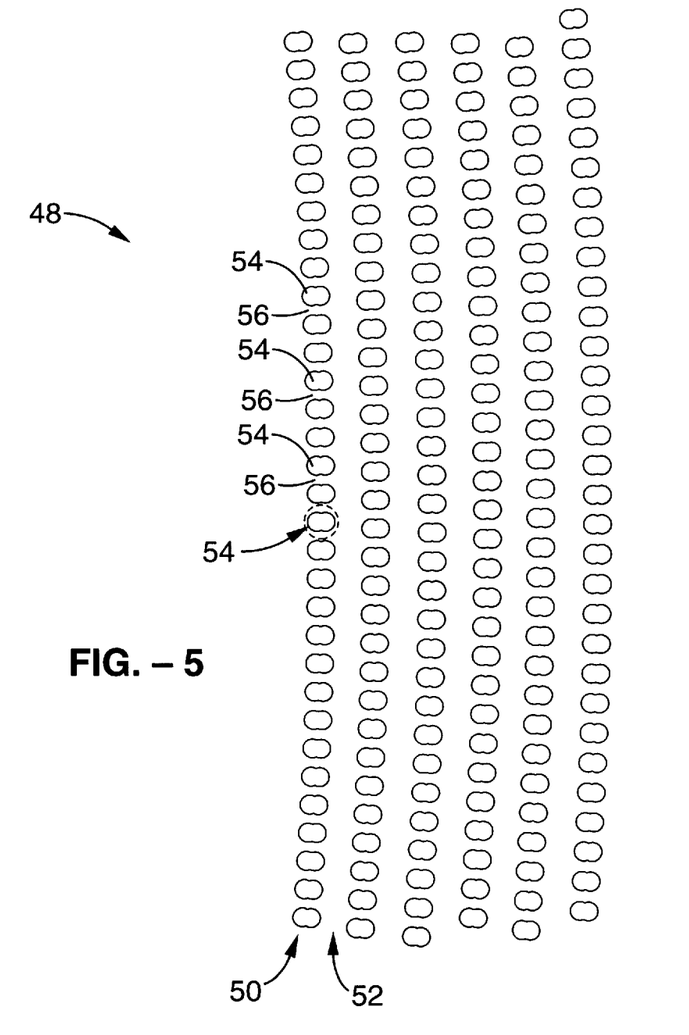
FIG. 5 is a top plan view in detail of a portion of a second embodiment eccentricity measurement pattern in accordance with the invention.
Figure 6:
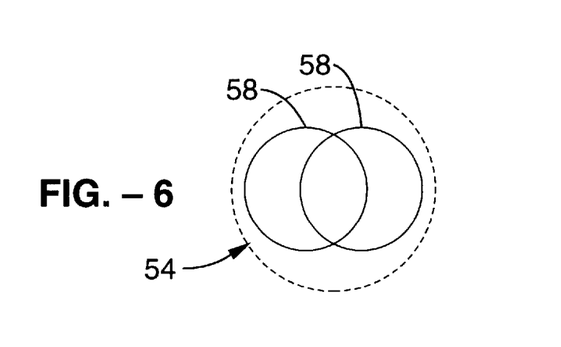
FIG. 6 is a detail view of a pit in the measurement pattern shown in FIG. 5 showing the overlapping pitlets forming the pit.

Referring now to FIG. 5 and FIG. 6, there is shown second embodiment eccentricity measurement pattern 48 which is a high density pattern that approaches the resolution limit. Eccentricity measurement pattern 48 includes a plurality of radially spaced apart concentric diffraction rings 50 separated by unpitted clear rings 52. Diffraction rings 50 are made from a plurality of alternating pits 54 and lands 56 which are small enough in size to form a diffraction grating at the frequency or wavelength of the laser light from lasers 32a, 32b, 32c of error read head 26. Pits 54 are formed as registered, overlapping pitlets or dots 58 as shown in FIG. 6. The length of the dots 58 in the circumferential direction is limited only by the bandwidth of the recording system, and the length of the composite pits 54 in the radial direction is a function of the number and amount of overlap in the overlapping recording passes. Because these are usually quite adjustable, there is a nearly infinite range of values for pit width, and thus diffraction ring width and spacing, which can be created for the eccentricity measurement pattern of the invention.

Figure 7:
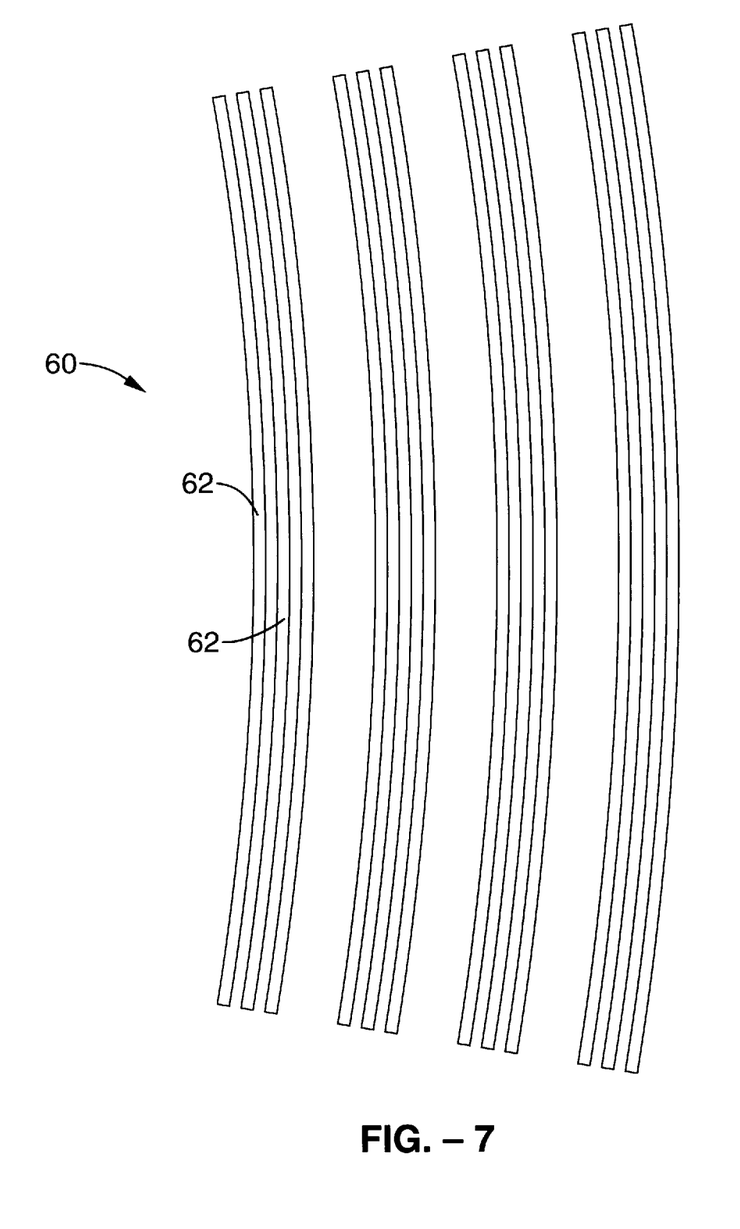
FIG. 7 is a top plan view of a portion of a third embodiment eccentricity measurement pattern in accordance with the invention.

Referring next to FIG. 7, there is shown a third embodiment eccentricity measurement pattern 60. The eccentricity measurement pattern 60 utilizes a series of concentric continuous rings 62 whose width and spacing is below the resolution limit for the lasers 32a, 32b, 32c in the error read head 26. Eccentricity measurement pattern 60 is presently less preferable than the eccentricity measurement patterns 36, 48, as eccentricity measurement pattern 60 provides a diffraction grating which suffers from greater physical limitations since the width of a "line" must be as large as the width of the recording beam, and an integer number of lines (2 or more) must be used. Since the space between the lines must be approximately equal to the line width, the minimum ring width in eccentricity measurement pattern 60 is about 3× the recording beam diameter (as compared with the 1.5× for eccentricity measurement pattern 36 described above). Also, since the aforementioned limitations apply, chosen widths must be near odd multiples of the recording beam diameter, and thus width is not continuously variable. In some applications, this may be acceptable.

Referring again to FIG. 2 through FIG. 4, the light from lasers 32a, 32b, 32c which is reflected from the eccentricity measurement pattern 36 on disk 10 is used to determine the radial position of disk 10 under error read head 26. By electrically distinguishing the presence or absence of reflected light, the receiver (not shown) on error read head 26 generates output signals that represent the relative position of the error read head 26 and the beams from lasers 32a, 32b, 32c over the diffraction rings 40 and clear rings 44 of eccentricity measurement pattern 36. As the diffraction rings 40 and clear rings 44 move radially under error read head 26 due to the eccentricity of disk 10, the amount of light from lasers 32a, 32b, 32c which is reflected by the eccentricity measurement pattern 36 changes, and waveforms result at the receiver of error read head 26 which represent the pattern of diffraction rings 40 and clear rings 44 as disk 10 and eccentricity measurement pattern 36 rotate.

By using all three lasers 32a, 32b, 32c in error read head 26, and orienting or positioning lasers 32a, 32b, 32c so that the relative radial spacing between lasers 32a, 32b, 32c is equal to a non integral multiple of the radial spacing or distance between diffraction rings 40, output signals are obtained from error read head 26 which can be used to measure the eccentricity of disk 10. For example, where the relative radial spacing of lasers 32a, 32b, 32c is n±⅓ the diffraction ring 40 spacing, the light from lasers 32a, 32b, 32c which is reflected from eccentricity measurement pattern 36 form a multiphase signal with sixty electrical degrees between each, resulting in a 6× multiplication in resolution, and determination of direction. Thus, for each period n between diffraction rings 40, six counts can be obtained (i.e. if the rings 40 are spaced at 1.5 $\mu$m intervals the invention has a counting resolution of 0.25 $\mu$m). By keeping track of this count in a computer or other digital counter circuit, relative position can be determined mathematically. This math can be carried out in a computer or digital circuit.

Note that while only six diffraction rings 40 are shown in eccentricity measurement pattern 36 (FIG. 3), the pattern 36 would in practice contain hundreds of concentric diffraction rings 40 and interposed clear rings 44. Likewise, the eccentricity measurement pattern 48 of FIG. 5 would contain hundreds of concentric diffraction rings 40 and clear rings 44. Furthermore, a single disk 10 could contain several different bands of eccentricity measurement patterns corresponding to different encoder resolutions, different operating diameters, etc. Although the upper achievable limit for pattern density is limited by the laser wavelength and the numerical aperture of the focus lens of the receiver, lower eccentricity measurement pattern densities can easily be achieved with the invention by widening the radial spacing between the diffraction rings and clear rings without changing the pit spacings within each diffraction ring.

Referring more particularly to FIG. 2, by adjusting the exact angle 64 between the e-line 30 and the line 66 passing through the three lasers 32a, 32b, 32c in error read head 26, it is possible to adjust the relative radial spacing of lasers 32a, 32b, 32c with respect to the radial spacing of diffraction rings 40 beneath lasers 32a, 32b, 32c. That is, the number of diffraction rings 40 (and fractions thereof) spanned by adjacent beams from lasers 32a, 32b, 32c can be changed by rotating or pivoting error read head 26 about the center laser 32b (which is aligned at the e-point 28). This is because the number of diffraction rings 40 spanned by lasers 32a, 32b, 32c is proportional to d cos q where d is the distance between beam read spots from lasers 32a, 32b, 32c and q is the adjustment angle 64 between e-line 30 and line 66. The result is an adjustable, relative spacing between lasers 32a, 32b, 32c and diffraction rings 40. Note that varying adjustment angle 64 and the relative radial spacing of lasers 32a, 32b, 32c will also vary the location of outer or satellite lasers 32a, 32c with respect to the circumference of disk 10. However, it is the relative radial spacing of lasers 32a, 32b, 32c with respect to the radial spacing of diffraction rings 40 which provides useful information, as described above.

Figure 8:
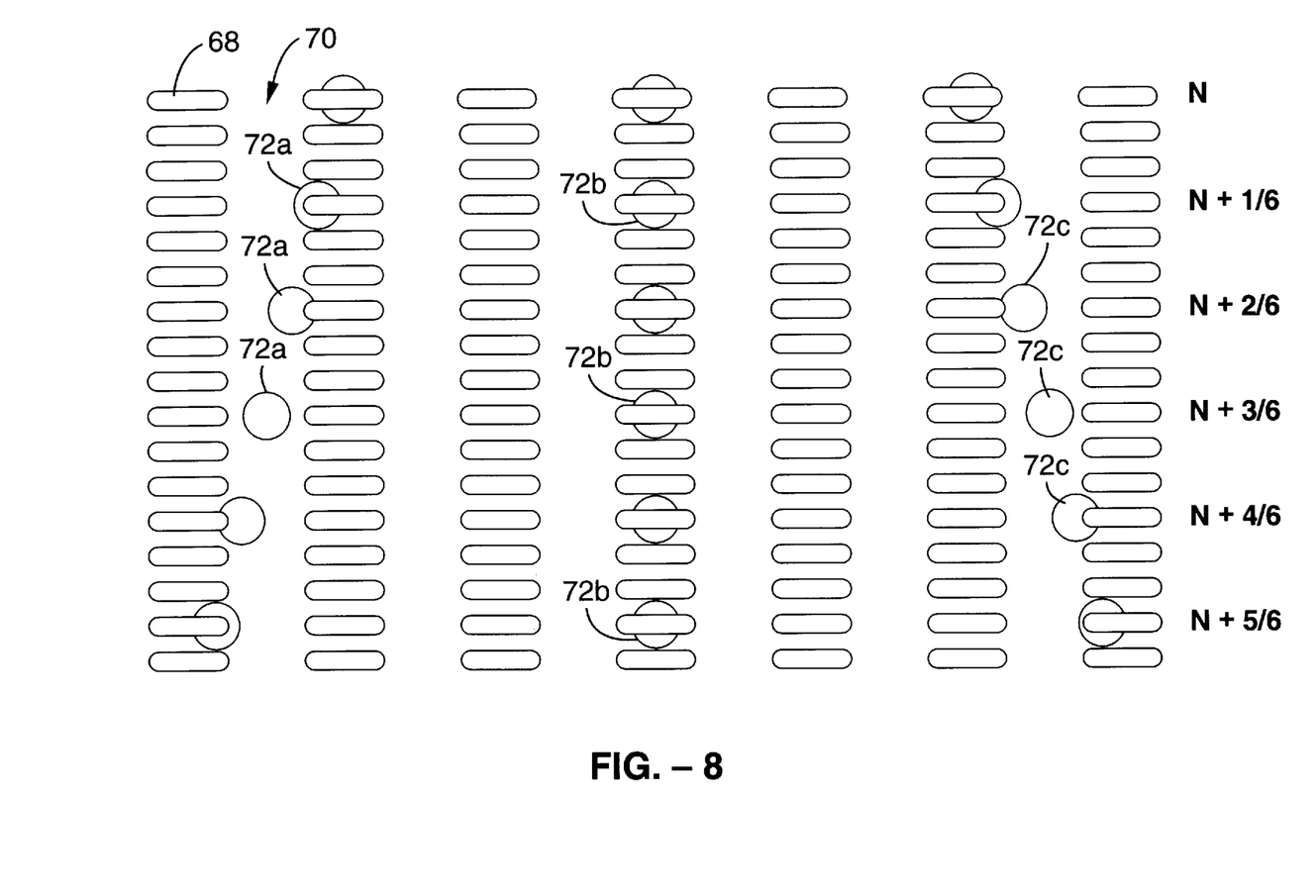
FIG. 8 is a diagrammatic representation of the relative radial spacing of laser spots from the error read head and the radial spacing of the diffraction rings of the eccentricity measurement pattern showing several "N+" fractional relationships of laser spots and diffraction rings wherein N=2 diffraction rings.
Figure 9A:
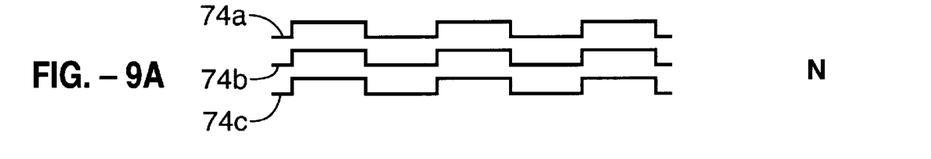
FIG. 9A through FIG. 9F are a diagrammatic representation of the output signals of the error read head for the relative spacing relationships of laser spots and diffraction rings shown in FIG. 8, with the output signals shown as square waves.
Figure 9B:
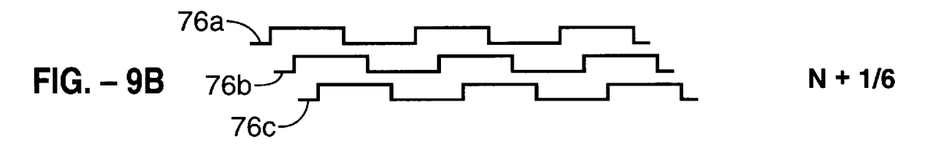
Figure 9C:
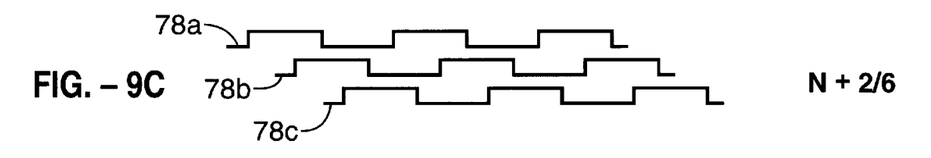
Figure 9D:
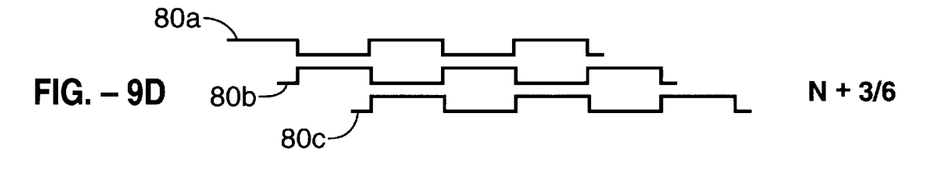
Figure 9E:
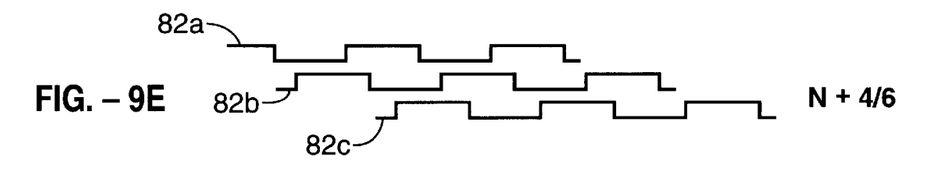
Figure 9F:
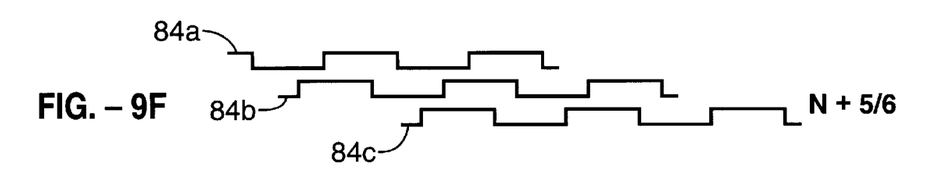
Figure 10:
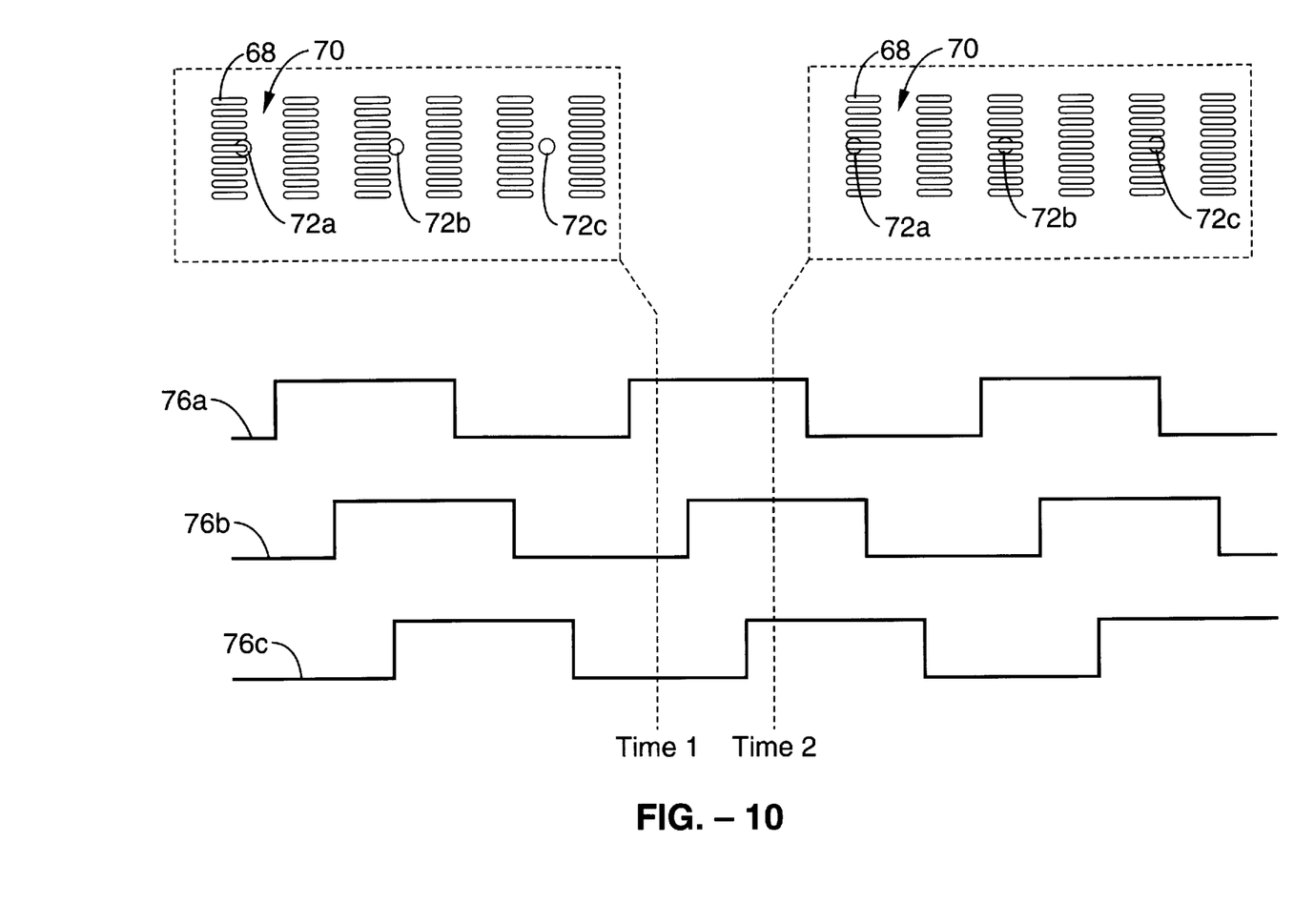
FIG. 10 is a detail view of the output signals of FIG. 9B shown in relation to laser spots and diffraction rings show in FIG. 8 for the relationship N+⅙.

Referring now to FIG. 8 through FIG. 10, as well as FIG. 2 through FIG. 4, six different relative spacing examples are diagrammatically shown as N, N+⅙, N+²⁄₆, N+³⁄₆, N+⁴⁄₆, and N+⅚. The relative spacing examples of FIG. 8 can be obtained by varying adjustment angle 64 by pivoting error read head 26 about center laser 32b and e-point 28, as described above. For reasons of clarity, each diffraction ring 40 in FIG. 3 is shown in FIG. 9 as a single elongated pit 68, with each pit 68 in FIG. 8 being representative of a full diffraction ring 40. Clear rings 44 are likewise shown in FIG. 8 simply as "lands" 70. Thus, for each relative spacing shown in FIG. 8, seven diffraction rings 40 and six clear rings 44 are represented by alternating pits 68 and lands 70. FIG. 8 through FIG. 10 illustrate that each of the six cases produces a different pattern of output signals.

Referring to the case of N in FIG. 8 and FIG. 9, three laser spots 72a, 72b, 72c are shown which correspond to lasers 32a, 32b, 32c respectively of error read head 26, and seven pits 68 which correspond to seven diffraction rings 40 of the eccentricity measurement pattern 36. Central laser spot 72b corresponds in position to the e-point 28 as described above. Example N illustrates a situation wherein the relative radial spacing between lasers 32a, 32b, 32c is an integral multiple of the spacing or distance between diffraction rings 40. Thus, the number of pits 68 and lands 70 between each laser spot 72a, 72b, 72c is an integral multiple such that each laser spot 72a, 72b, 72c are directed onto and reflect off of the same arrangement of pits and lands 68, 70. As shown, laser spots 72a, 72b, 72c are positioned over the centers of pits 68, with N=2 or two pits 68 generally located between each laser spot, and with all three laser spots spanning a total of five pits 68.

In the case of N, where the relative radial spacing between lasers 32a, 32b, 32c is an integral multiple of the spacing of diffraction rings 40, the relative spacing is not particularly useful since the light reflected by satellite spots 72a, 72c provide no information to the receiver in error read head 26 in addition to that already provided by central spot 72b. The output signals from the receiver of error read head 26 for Example N are shown in FIG. 9A as square waves 74a, 74b, 74c, which are identical.

Referring next to the case of N+⅙ in FIG. 8, the laser spots 72a, 72b, 72c have non-integral relative spacings of N+⅙ or are separated by N+⅙ diffraction rings 40 (shown as individual pits 68 with N=2 pits 68), and thus are fully differentiated; that is, each laser spot 72a, 72b, 72c reflects off a different portion of a diffraction ring 40 than the other laser spots at any given instant. As shown in FIG. 9B, the square wave output signals 76a, 76b, 76c corresponding to the laser spots of the N+⅙ example are all different. Thus, three times as much information is provided than would be provided by from a single laser or as in the case of N described above.

By establishing a threshold point halfway between the maximum and minimum reflected brightness of laser spots 72a, 72b, 72c ( Just as is done during conventional reading of normal CDs), the output signals 76a, 76b, 76c can be converted to binary representations: a 1 for light, and 0 for dark. The result is a repeating binary pattern which indicates not only disk movement, but also direction information. For example, referring also to FIG. 10 in the case of "Time 1", the output is 100. If the disk is moving inward, that is in a direction such that the diffraction rings 40 between laser spot 72b and laser spot 72c are moving towards lasers pot 72c and the ideal center 14 is moving away from the error head 26, the next code will be 110 (and then 111 at "Time 2"). If instead the next code after Time 1 were 000, then the disk must have moved outwards, that is, in a direction such that the ideal center 14 moves towards the error head 26. In the inward direction, the pattern proceeds: 100, 110, 111, 011, 001, 000, 100, In the outward direction it is: 100, 000, 001, 011, 111, 110, 100 , . . .

Referring next to the case of N+²⁄₆ (FIG. 9C), laser spots 72a, 72b, 72c have non-integral relative spacing which provide fully differentiated information, and result in output signals 78a, 78b, 78c respectively. However, the output signals 78a, 78c due to satellite spots 72a, 72c are inverted and transposed relative to each other.

In the case of N+³⁄₆ relative spacing of lasers 32a, 32b, 32c (FIG. 9D), the satellite spots 72a, 72c generate output signals 80a, 80c which carry only the inverted information of the output signal 80b from center laser spot 72b. Thus, like the case of N described above, a relative spacing of N+³⁄₆ is not useful.

In the case of N+⁴⁄₆ relative spacing (FIG. 9E), laser spots 72a, 72b, 72c are fully differentiated like in the N+⅙ example, but the output signals 82a, 82c, corresponding to detection of light reflected from spots 72a, 72c, are inverted.

In the case of relative spacing of N+⅚ (FIG. 9F), laser spots 72a, 72b, 72c and output signals 84a, 84b, 84c are fully differentiated like the case of N+⅙ relative spacing. However, the output signals 84a, 84c due to satellite laser spots 72a, 72c are transposed.

The case of N+⁶⁄₆ is not illustrated because N+⁶⁄₆ is an integral relative spacing and is simply the same as N where N is one integer larger.

In the cases of N+²⁄₆, N+⁴⁄₆ and N+⅚, a simple logic circuit can be used with the invention to interface the output signals from the error read head 26 to a conversion circuit or computer so that the output signals from the N+²⁄₆, N+⁴⁄₆ and N+⅚ cases appear as in the N+⅙ case. Making such an interface circuit switch or jumper selectable would allow configuration of the error read head 26 to be carried out prior to and/or during assembly of the encoded disk 10 and would allow the adjustment angle 64 to be set for any of the four usable cases N+⅙, N+⅔, N+⅘ and N+⅚ described above.

In the case of relative spacing of lasers 32a, 32b, 32c which are fractions of integer N which fall between any of the four usable case the four usable cases N+16, N+⅔, N+⅘ and N+⅚, the output signal pattern will be similar to whichever of the four useful cases it is nearest, except that the size of the count intervals will not be equal, thus reducing the accuracy of the corresponding output signals.

Once the outputs signals from error read head 26 are configured as N+⅙ type signals as described above and shown in FIG. 9, converting the output signals to a count and direction signal for input into a high-speed bi-directional counter is simply a matter of a state machine (not shown) which looks for changes in the output state, and based upon the rules of the pattern, predicts what should come next in an inward or outward direction (or if a valid synch state could be next, its state). When a change of state occurs, the state machine compares the new state to its last predictions, sets the direction signal accordingly, and outputs a count pulse.

Referring more particularly to FIG. 1, the error in angular measurement of disk 10 or other rotating body introduced by the component of eccentricity in the direction perpendicular to reference line 24 typically is nearly equal to the magnitude of the component of eccentricity in the direction parallel to the reference line 24, as discussed above, and the error caused by the component of eccentricity in the direction of the reference line 24 can generally be neglected. Disk 10 is shown as solid circle representing the ideal location for a disk 10 centered on the central rotational axis 16. A dashed circle represents disk 10 displaced from its ideal position, both horizontally and vertically (by differing amounts to illustrate the general case). Reference point 22 and the orthogonal e-point 28 are also shown on the solid and dashed representations of disk 10. Although the displacements shown between dashed and solid lines representing disk 10 are much larger than would realistically be encountered, they are useful for illustrative purposes, and will represent a general case. The eccentricity measurement pattern of the invention is omitted from FIG. 1 for clarity.

If the φ=sin φ simplification discussed below is used, then:

Corrected_Count=Measured_Count−Measured_Shift.

As can be seen in FIG. 1, the true horizontal shift component of eccentricity is dX. The change in Measured_Count is the count corresponding to an angle of φ. The Measured_Shift is dR. In normal cases, where dX and dY are very small compared to R, $$dX \approx R \sin \phi \approx R\phi \text{ and } dR \approx dX$$

and therefore:

$$R\phi \approx dR$$

To be exact, where the length of the arc≅Rφ:

$$\phi = \tan^{-1}(dX/(R+dY))$$

and for:

$$R' = R - dR$$

$$R' = (dY^2 + (R-dX)^2)$$

therefore:

$$dR = R - (dY^2 + (R-dX)^2)$$

To illustrate that Rφ≅dR, Table 1 provides the results of several example calculations. Where e=eccentricity ($e^2 = dX^2 + dY^2$), the worst values for Rφ−dR occur when dX=dY, but even then, it is clear that the simplification that for large ratios of R to e, the simplification Rφ=dR is a very good approximation. Table 1 illustrates that even for a 60 mm disk with 20 μm of eccentricity, the residual error is only ¹⁄₄₀ μm! This would represent ±¼ LSB for a optical disk reading system with 0.1 um incremental resolution.

TABLE 1

| R | e | dX | dY | Ro | dR | Ro − dR | residual error |
|---|---|---|---|---|---|---|---|
| 100000 | 1 | 0.00000000 | 1.00000000 | 0.0000000 | −0.00000500 | −0.000005000 | 0.00050000 |
| 100000 | 1 | 1.00000000 | 0.00000000 | 1.0000000 | −1.00000000 | −0.000000000 | 0.00000000 |
| 100000 | 1 | 0.70710678 | 0.70710678 | 0.7071017 | −0.70710928 | −0.000007500 | 0.00075000 |
| 100000 | 10 | 7.07106781 | 7.07106781 | 7.0705678 | −7.07131779 | −0.000749959 | 0.00749959 |
| 100000 | 100 | 70.71067812 | 70.71067812 | 70.667016 | −70.73566045 | −0.074958761 | 0.07495876 |
| 100000 | 1000 | 707.10678119 | 707.10678119 | 702.1303500 | −709.58919704 | −7.458847029 | 0.74588470 |
| 60000 | 20 | 14.14213562 | 14.14213562 | 14.1388028 | −14.14380190 | −0.004999083 | 0.02499542 |

Figure 11:
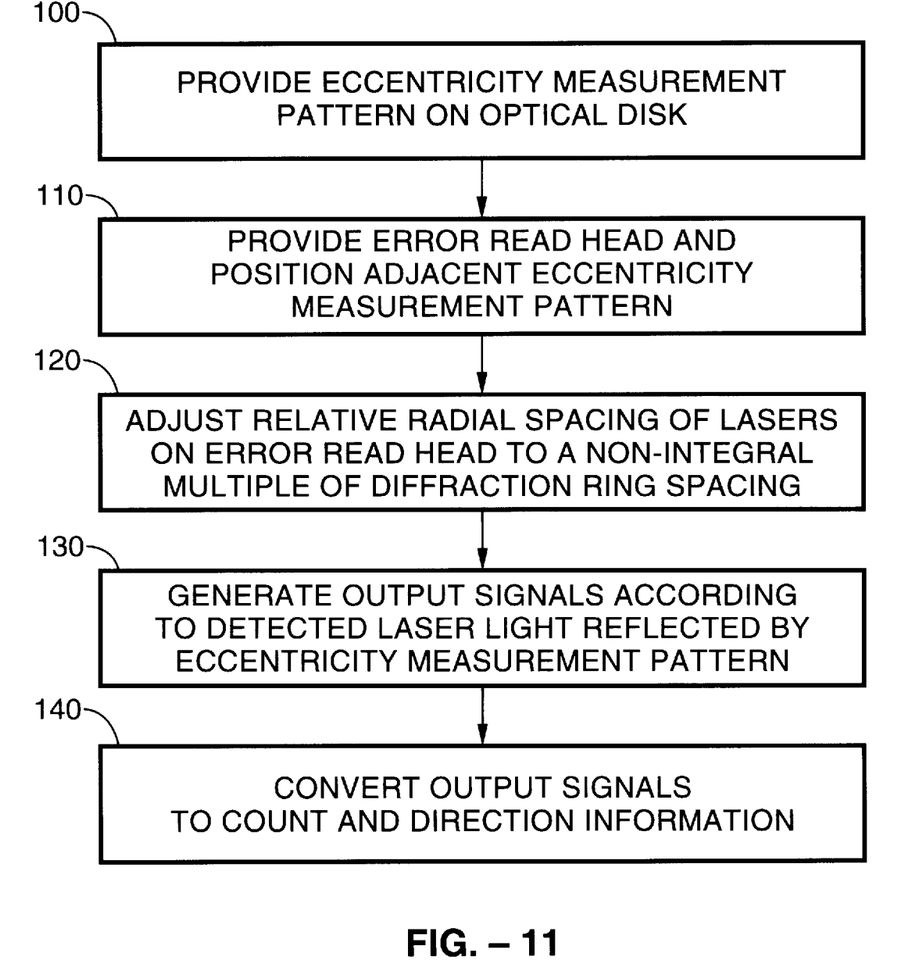
FIG. 11 is a flow chart showing generally the steps of the method of the present invention.

The present invention will also be more fully understood by reference to FIG. 11, wherein a flow chart outlining generally the steps of using the invention is generally shown. At step 100, an eccentricity measurement pattern 36 is provided on a rotating body such as encoded disk 10. As stated above, the eccentricity measurement pattern 36 comprises a series of concentric, radially spaced apart diffraction rings 40 formed by a series of alternating spaced apart "pits" 38 and "lands" 42 which are small enough in size to form a diffraction grating at the wavelength of the reading lasers provided in a subsequent step. Each concentric diffraction ring 40 is radially separated or spaced apart from adjacent diffraction rings 40 by a clear ring 44 comprising unpitted land.

At step 110, an error read head 26 is provided and positioned adjacent disk 10 over eccentricity measurement pattern 36. As described above, error read head 26 is positioned over the e-point 28 at a position which is ninety degrees around the central rotation axis 16 of disk 10 from reference point 22. Error read head 26 includes three co-linearly arranged lasers 32a, 32b, 32c which are aligned generally with e-line 30, with laser 32b located over e-point 28, and with lasers 32a, 32b, 32c positioned to reflect light off of eccentricity measurement pattern 36 on disk 10.

At step 120, error read head 26 is positioned or oriented so that the relative radial spacing between lasers 32a, 32b, 32c and the corresponding laser spots 72a, 72b, 72c are equal to a non-integral multiple of the radial spacing or distance between concentric diffraction rings 40 of eccentricity measurement pattern 36. As related above, the number of diffraction rings 40 spanned by adjacent beams 72a, 72b, 72c from lasers 32a, 32b, 32c, and thus the relative radial spacing of lasers 32a, 32b, 32c with respect to the radial spacing of diffraction rings 40, is preferably changed by altering adjustment angle 64 by rotating or pivoting error read head 26 about the center laser 32b, which is aligned at the e-point 28. As shown in FIG. 8 through FIG. 10 and described above, a relative radial spacing of N+⅙ for lasers 32a, 32b, 32c and laser spots 72a, 72b, 72c, with N being equal to an integral multiple of the radial spacing between diffraction rings 40, is preferred.

At step 130, output signals are generated by the error read head 26 according to detection of light from lasers 32a, 32b, 32c which is reflected off of eccentricity measurement pattern 36 and detected by the receiver optics of error read head 26. As stated above, relative radial spacings for lasers 32a, 32b, 32c and laser spots 72a, 72b, 72c of N+⅔, N+⅘, and N+⅚, with respect to the radial spacing between diffraction rings 40 may be adjusted in step 120 if a suitable logic circuit is used with the invention in conjunction with step 130, so that the output signals from error read head 26 are configured as N+⅙ type output signals.

At step 140, the output signals generated by error read head 26 in step 130 are converted to count and direction information for use in correcting the eccentric error of disk 10. Converting the output signals of step 130 to count and direction signal for input into a high-speed bidirectional counter may be carried out by a state machine or a programmable data processor which looks for changes in the state of the output signals and, based upon the value of the output signals from eccentricity measurement pattern 36, predicts what output signals should come next due to clockwise or counter-clockwise rotation of optical disk 10. When a change of state occurs, the state machine compares the new state to its last predictions, sets the direction signal accordingly, and outputs a count pulse.

There are a wide variety of applications for the present invention in addition to measuring eccentricity in optical encoded disks. While the present invention could be used with almost any rotary encoder device, the invention is particularly useful with high resolution optical or bar code type encoders (either relative or absolute). Depending upon the resolution and construction of the particular sensing device used for reading the encoded data on disk 10, the eccentricity of the encoded disk 10 in the direction perpendicular to the reference line 24 may cause significant error in the angular position measurement of disk 10. The accuracy of such a measurement can be greatly increased if the amount of eccentric error is known. By measuring the component of eccentricity in the direction perpendicular to the reference line 24, the eccentric error can be computed. Subtracting out this eccentric error from the measurement taken at the reference point 22 yields a corrected measurement of the angular position of disk 10. Because the eccentric error cannot be computed exactly (since the component of eccentricity cannot be measured with infinite precision) there will always be some residual error. The residual error however will generally be much smaller than the original error, thereby yielding significant increases in the overall accuracy of the device. Furthermore it allows more cost-effective, and more reliable optical reading devices to be built by allowing greater mechanical tolerances within an assembly of a given output accuracy.

Another application of the invention is in the area of direct measurement of eccentricity of rotating shafts and parts. For example, industries and persons who make or use bearings, bushings, or other rotating assemblies often need to measure the eccentricity in a given assembly. Using the invention with error read heads aligned so as to measure orthogonal components of eccentricity allows the total eccentricity to be computed as the vector sum of the two measurements. In such an application, the encoded disk would not contain any encoded data other than the eccentricity measurement pattern. The disk with the eccentricity measurement pattern written thereon would be mounted to the shaft or rotating member whose eccentricity is to be measured, and the error read head and rest of the invention apparatus would be appropriately mounted to a stationary member adjacent the disk and positioned as described above.

Accordingly, it will be seen that this invention provides an apparatus and method for real time measuring of the eccentricity in a rotating body such as an encoded disk. Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for measuring eccentricity in a rotating body, comprising:
   (a) an eccentricity measurement pattern, said eccentricity measurement pattern located on said rotating body, said eccentricity measurement pattern including a plurality of concentric, spaced apart diffraction rings; and
   (b) an error read head, said error read head positioned adjacent said rotating body, said error read head including a plurality of laser beams, said laser beams positioned to direct light towards said eccentricity measurement pattern, said error read head including receiver means for detection of laser light reflected by said eccentricity measurement pattern, said receiver means producing output signals responsive to detected said laser light reflected by said eccentricity measurement pattern.

2. An apparatus as recited in claim 1, wherein said error read head comprises:
   (a) three spaced apart laser beams, said three laser beams positioned on said error read head in a co-linear relationship; and
   (b) means for adjusting the relative spacing of said three laser beams with respect to the spacing of said concentric diffraction rings of said eccentricity measurement pattern.

3. An apparatus as recited in claim 2, wherein said spacing between said laser beams on said error read head is equal to a non-integral multiple of the spacing between said concentric diffraction rings of said eccentricity measurement pattern.

4. An apparatus as recited in claim 1, further comprising a reference read head, said reference read head including a plurality of laser beams, said reference read head positioned adjacent said rotating body, said reference read head circumferentially spaced apart from said error read head.

5. An apparatus as recited in claim 1, further comprising means for converting said output signals from said receiver means of said error read head into count and direction signals.

6. An apparatus as recited in claim 1, wherein said diffraction rings each comprise a plurality of alternating pits and lands, said pits and said lands having widths which are below the diffraction limit of the light from said lasers on said error read head.

7. An apparatus as recited in claim 1, wherein said eccentricity measurement pattern further comprises a plurality of concentric clear rings, one said clear rings located between adjacent said diffraction rings.

8. An apparatus for measuring rotational eccentricity, comprising:
   (a) an optical disk, said optical disk having a rotational axis;
   (b) an eccentricity measurement pattern, said eccentricity measurement pattern included on said optical disk, said eccentricity measurement pattern including a plurality of concentric, spaced apart diffraction rings; and
   (b) an error read head, said error read head positioned adjacent said optical disk, said error read head including a plurality of laser beams, said laser beams positioned to direct light towards said eccentricity measurement pattern, said error read head including receiver means for detection of laser light reflected by said eccentricity measurement pattern, said receiver means producing output signals responsive to detected said laser light reflected by said eccentricity measurement pattern.

9. An apparatus as recited in claim 8, wherein said error read head is positioned over an error point, said error point lying on an error line, said error line extending radially outward from said rotational axis of said disk to said error point.

10. An apparatus as recited in claim 9, further comprising a reference read head, said reference read head including a plurality of laser beams, said reference read head positioned over a reference point, said reference point lying on a reference line, said reference line extending radially outward from said rotational axis of said disk to said reference point.

11. An apparatus as recited in claim 10, wherein said reference point and said error point are substantially equidistant from said rotational axis, and said reference line and said error line are radially separated by an angle of approximately ninety degrees.

12. An apparatus as recited in claim 9, wherein said error read head includes a first laser beam, a second laser beam, and a third laser beam, said first, second and third laser beams positioned on said error read head in a substantially co-linear relationship, said second laser beam positioned over said error point, said error read head pivotally movable about said second laser beam and said error point.

13. An apparatus as recited in claim 12, further comprising pivoting means for adjusting the angle between said error line and a line passing through said three co-linear laser beams on said error read head, and for adjusting the relative spacing of said three laser beams with respect to the spacing of said concentric diffraction rings of said eccentricity measurement pattern.

14. An apparatus as recited in claim 13, wherein said relative spacing between said laser beams on said error read head is equal to a non-integral multiple of said spacing between said concentric diffraction rings of said eccentricity measurement pattern.

15. An apparatus as recited in claim 14, further comprising means for converting said output signals from said receiver means of said error read head into count and direction signals.

16. An apparatus as recited in claim 8, wherein said diffraction rings comprise a plurality of alternating pits and lands, said pits and said lands having widths which are below the diffraction limit of the light from said lasers on said error read head.

17. An apparatus as recited in claim 16, wherein said eccentricity measurement pattern further comprises a plurality of clear rings, one said clear rings located between adjacent said diffraction rings.

18. A method for measuring rotational eccentricity, comprising the steps of
   (a) providing an eccentricity measurement pattern on an optical disk, said eccentricity measurement pattern including a plurality of concentric, spaced apart diffraction rings;
   (b) providing an error read head, said error read head including a plurality of spaced apart, co-linearly positioned laser beams, said laser beams positioned to direct light towards said eccentricity measurement pattern, said error read head including receiver means for detection of laser light reflected by said eccentricity measurement pattern;
   (c) adjusting the relative spacing between said laser beams on said error read head such that said relative spacing between said lasers is equal to a non-integral multiple of the spacing between said concentric diffraction rings of said eccentricity measurement pattern; and
   (d) producing output signals by said receiver means, said output signals responsive to said laser light reflected by said eccentricity measurement pattern and detected by said receiver means.

19. A method as recited in claim 18, further comprising the step of converting said output signals to count and direction information.

* * * * *